(12) United States Patent
Park

(10) Patent No.: US 10,268,364 B2
(45) Date of Patent: Apr. 23, 2019

(54) ELECTRONIC DEVICE AND METHOD FOR INPUTTING ADAPTIVE TOUCH USING DISPLAY OF ELECTRONIC DEVICE

(71) Applicant: Samsung Electronics Co., Ltd., Suwon-si (KR)

(72) Inventor: Jin-Seok Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/498,121

(22) Filed: Apr. 26, 2017

(65) Prior Publication Data

US 2017/0308227 A1    Oct. 26, 2017

(30) Foreign Application Priority Data

Apr. 26, 2016 (KR) .......................... 10-2016-0051145

(51) Int. Cl.
| | |
|---|---|
| *G06F 3/16* | (2006.01) |
| *G06F 3/0481* | (2013.01) |
| *G06F 3/0484* | (2013.01) |
| *G06F 3/0486* | (2013.01) |
| *G06F 3/0488* | (2013.01) |

(52) U.S. Cl.
CPC .......... *G06F 3/0488* (2013.01); *G06F 3/0486* (2013.01); *G06F 3/04817* (2013.01); *G06F 3/04842* (2013.01); *G06F 3/04845* (2013.01); *G06F 3/167* (2013.01); *G06F 2203/04808* (2013.01)

(58) Field of Classification Search
CPC ......................................... A63F 13/20–13/285
See application file for complete search history.

(56) References Cited

U.S. PATENT DOCUMENTS

| | | | | | |
|---|---|---|---|---|---|
| 4,687,200 | A | * | 8/1987 | Shirai ..................... | A63F 13/06 200/339 |
| D375,326 | S | * | 11/1996 | Yokoi ......................... | D14/401 |
| 5,820,462 | A | * | 10/1998 | Yokoi ..................... | A63F 13/06 463/37 |
| 5,919,092 | A | * | 7/1999 | Yokoi ..................... | A63F 13/06 273/148 B |
| 6,010,406 | A | * | 1/2000 | Kajikawa ................ | A63F 13/06 463/37 |
| 6,037,930 | A | * | 3/2000 | Wolfe ................. | G06F 3/03547 178/18.05 |

(Continued)

FOREIGN PATENT DOCUMENTS

KR   10-2014-0139241 A   12/2014

*Primary Examiner* — Patrick F Marinelli

(57) ABSTRACT

An electronic device includes a display, a sensor and a processor. The processor is configured to activate the display in a first input mode to acquire a first touch input through the display, and to identify context information related to the electronic device through the display or the sensor. The processor also is configured to change the display to a second input mode to acquire a second touch input through one or more areas of the display when the context information meets a predetermined condition. In addition, the processor is configured to execute a predetermined function related to at least one object displayed on the display based on the second touch input acquired through the one or more areas while the display is in the second input mode.

24 Claims, 11 Drawing Sheets

(56) References Cited

U.S. PATENT DOCUMENTS

| | | | | |
|---|---|---|---|---|
| 8,382,591 B2* | 2/2013 | Toy | A63F 13/10 | 463/37 |
| 8,451,236 B2* | 5/2013 | Duarte | G06F 3/0488 | 345/173 |
| 8,678,927 B2* | 3/2014 | Hammontree | A63F 13/06 | 463/20 |
| 9,122,394 B2* | 9/2015 | Funabashi | G06F 3/04886 | |
| 9,174,124 B2* | 11/2015 | Hammontree | A63F 13/06 | |
| 9,207,864 B2* | 12/2015 | Funabashi | G06F 3/04886 | |
| 9,227,141 B2* | 1/2016 | Mays, III | A63F 13/2145 | |
| 9,262,073 B2* | 2/2016 | Howard | G06F 3/04815 | |
| 9,411,509 B2* | 8/2016 | Berkes | G06F 3/04883 | |
| 9,817,569 B2* | 11/2017 | Berkes | G06F 3/04883 | |
| 9,827,490 B2* | 11/2017 | Mays, III | A63F 13/26 | |
| 2004/0235569 A1* | 11/2004 | Yokoi | A63F 13/06 | 463/43 |
| 2006/0161871 A1* | 7/2006 | Hotelling | G06F 3/0485 | 715/863 |
| 2008/0217075 A1* | 9/2008 | Gordner | G06F 3/0234 | 178/18.01 |
| 2008/0309626 A1* | 12/2008 | Westerman | G06F 3/0485 | 345/173 |
| 2009/0207141 A1* | 8/2009 | Dubs | G06F 3/0488 | 345/173 |
| 2009/0287470 A1* | 11/2009 | Farnsworth | G06F 17/27 | 704/3 |
| 2010/0156813 A1* | 6/2010 | Duarte | G06F 3/0488 | 345/173 |
| 2010/0328236 A1* | 12/2010 | Ma | G06F 3/038 | 345/173 |
| 2011/0242138 A1* | 10/2011 | Tribble | G06F 3/04886 | 345/663 |
| 2011/0285636 A1* | 11/2011 | Howard | G06F 3/04815 | 345/173 |
| 2011/0300934 A1* | 12/2011 | Toy | A63F 13/2145 | 463/31 |
| 2012/0078756 A1* | 3/2012 | Tsugihashi | G06F 9/44505 | 705/27.1 |
| 2012/0169610 A1* | 7/2012 | Berkes | G06F 3/04883 | 345/173 |
| 2013/0009890 A1 | 1/2013 | Kwon | | |
| 2013/0024806 A1* | 1/2013 | Funabashi | G06F 3/04886 | 715/781 |
| 2013/0084980 A1* | 4/2013 | Hammontree | A63F 13/06 | 463/36 |
| 2013/0288790 A1* | 10/2013 | Wang | A63F 13/06 | 463/31 |
| 2013/0300702 A1* | 11/2013 | Kang | G06F 3/017 | 345/173 |
| 2014/0011584 A1* | 1/2014 | Shin | G06F 3/048 | |
| 2014/0098038 A1* | 4/2014 | Paek | G06F 1/1692 | 345/173 |
| 2014/0155165 A1* | 6/2014 | Hammontree | A63F 13/06 | 463/31 |
| 2014/0191954 A1* | 7/2014 | Marvit | G06F 1/1613 | 345/156 |
| 2014/0232653 A1 | 8/2014 | Yagihashi et al. | | |
| 2014/0351768 A1 | 11/2014 | Park | | |
| 2015/0042585 A1* | 2/2015 | Lin | G06F 3/04883 | 345/173 |
| 2015/0103032 A1 | 4/2015 | Bell | | |
| 2015/0134642 A1* | 5/2015 | Chomley | G06F 3/04886 | 707/722 |
| 2015/0182856 A1* | 7/2015 | Mays, III | A63F 13/2145 | 463/31 |
| 2015/0378459 A1* | 12/2015 | Sawada | G06F 3/0488 | 345/173 |
| 2016/0041717 A1* | 2/2016 | Hammontree | A63F 13/06 | 463/38 |
| 2016/0147498 A1* | 5/2016 | Son | G06F 3/1454 | 345/2.2 |
| 2016/0210011 A1* | 7/2016 | Ho | G06F 3/0488 | |
| 2016/0220902 A1* | 8/2016 | Howard | G06F 3/04815 | |
| 2016/0328069 A1* | 11/2016 | Berkes | G06F 3/04883 | |
| 2017/0017332 A1* | 1/2017 | Lin | G06F 3/039 | |
| 2017/0308227 A1* | 10/2017 | Park | G06F 3/0416 | |
| 2018/0102111 A1* | 4/2018 | Chen | G09G 5/005 | |

* cited by examiner

ELECTRONIC DEVICE AND METHOD FOR INPUTTING ADAPTIVE TOUCH USING DISPLAY OF ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Apr. 26, 2016, and assigned Serial No. 10-2016-0051145, the entire disclosure of which is incorporated herein by reference.

TECHNICAL FIELD

The present disclosure relates to a touch input and, more particularly, to an electronic device capable of inputting an adaptive touch using a display and a method of inputting a touch by an electronic device.

BACKGROUND

There are various types of input modules of electronic devices. Although input modules, such as a keyboard or mouse were conventionally used for the electronic devices, a touch screen is presently used as the input module.

The touch screen may serve as, for example, both a display of displaying a screen of the electronic device and an input module of detecting a user's touch and receiving input data. A capacitive type or a resistive type is widely used for the touch screen. Further, the touch screen may detect a user's touch (for example, finger touch) through a touch screen panel implemented in the capacitive type or the resistive type.

SUMMARY

To address the above-discussed deficiencies, it is an object to provide a touch input acquired through a display functionally connected to an electronic device is generated when the user directly moves his/her own body part (for example, a finger) or a touch input means (for example, a touch pen) to a position on which the user desires to make an input (for example, a touch input). However, as the display of the electronic device becomes larger, a distance by which the user moves for the touch input becomes longer, so that the user may have difficulty in moving the finger or the touch pen to the position on which the user desires to make the input (for example, the touch input) while in a state where the user grasps the electronic device. Further, in general, a relatively heavy device should be grasped by user's both hands for the stable use of the device, but the grasping with both hands may cause difficulty in making a touch input.

Further, the display, for example, the touch screen, may not provide an interface other than the user's direct touch. The touch screen may display an effect by the direct touch on the screen, but may not provide other effects except therefor.

According to various embodiments of the present disclosure, for example, it is possible to navigate a location of a touch input in a position or an area where a user's finger or a touch pen can make a touch even in a state where the user grasps the electronic device with both hands. The electronic device may provide an effect through various interfaces as well as the user's direct touch through, for example, the display.

Various embodiments may provide, for example, an electronic device for acquiring, without moving to a position where the user desires to touch with a user's finger or a touch pen within a display area, a touch input corresponding to the corresponding position, and an adaptive touch input method using a display of the electronic device.

In accordance with an aspect of the present disclosure to solve the above problems or other problems, an electronic device is provided. The electronic device includes: a display; a sensor; and a processor, wherein the processor is configured to activate the display in a first input mode to acquire a first touch input through the display, to identify context information related to the electronic device through the display or the sensor, to change the display to a second input mode to acquire a second touch input through one or more areas of the display when the context information meets a predetermined condition, and to execute a predetermined function related to at least one object displayed on the display based on the second touch input acquired through the one or more areas while the display is in the second input mode.

In accordance with another aspect of the present disclosure, a method of performing an adaptive touch input using a display of an electronic device is provided. The method includes: activating the display in a first input mode to acquire a first touch input through the display; identifying context information related to the electronic device through the display or the sensor; changing the display to a second input mode to acquire a second touch input through one or more areas of the display when the context information meets a predetermined condition; and executing a predetermined function related to at least one object displayed on the display based on the second touch input acquired through the one or more areas while the display is in the second input mode.

In accordance with another aspect of the present disclosure, a computer-readable recording medium having a program recorded therein to be executed in a computer is provided. The program includes executable instructions to cause, when executed by a processor, the processor to perform operations. The operations include: activating the display in a first input mode to acquire a first touch input through the display; identifying context information related to the electronic device through the display or the sensor; changing the display to a second input mode to acquire a second touch input through one or more areas of the display when the context information meets a predetermined condition; and executing a predetermined function related to at least one object displayed on the display based on the second touch input acquired through the one or more areas while the display is in the second input mode.

According to various embodiments of the present disclosure, for example, without moving a user's body part (for example, a finger) or a touch pen to a desired touch position, in a position or an area where the user's finger or the touch pen can make a touch within a predetermined fixed position (for example, grasped location), the user may acquire an input for the corresponding touch position by navigating the position of the touch input, thereby improving user convenience and may grasp the electronic device with both hands, thereby stably performing the touch input.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
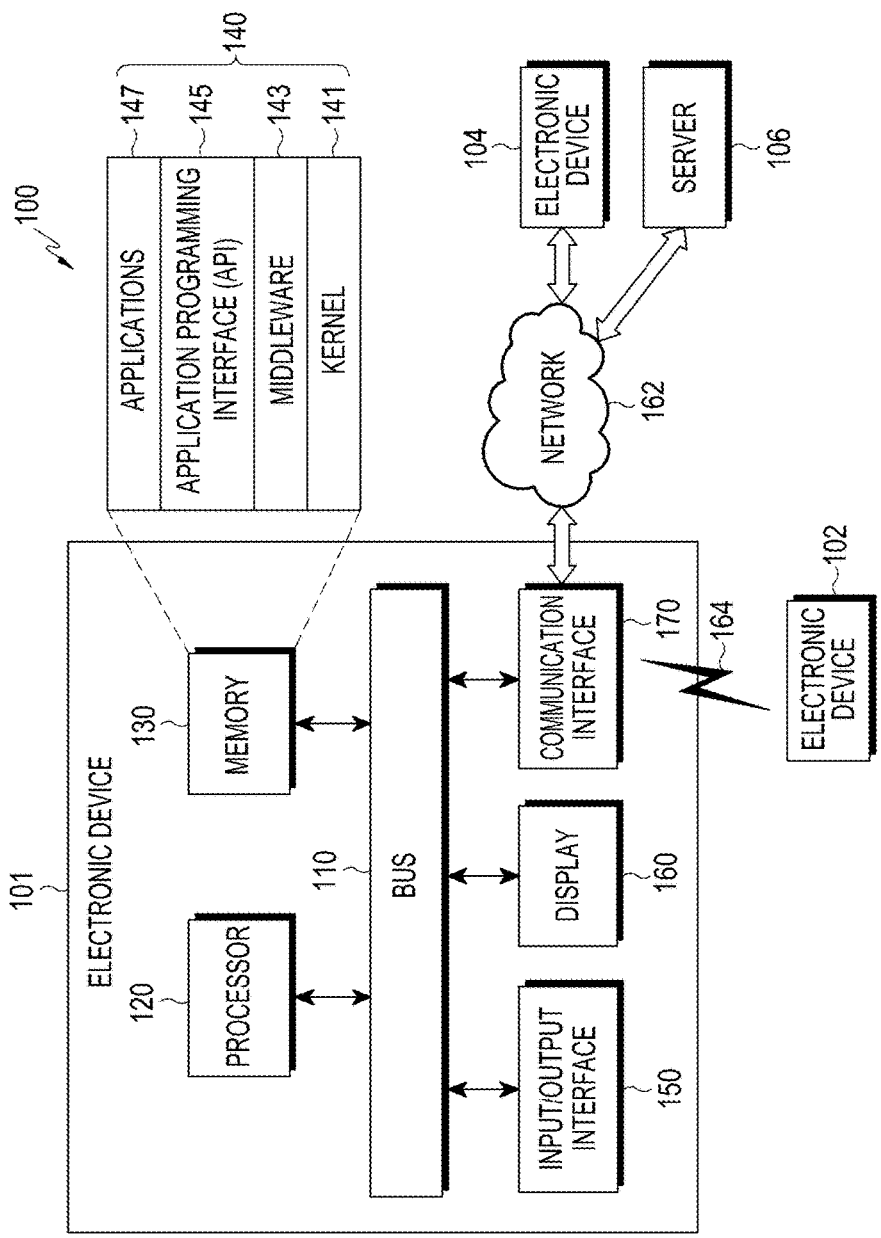
FIG. 1 illustrates a network environment according to various embodiments.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates a network environment according to various embodiments.

An electronic device 101 within a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that connects the elements 120, 130, and 150 to 170 and transfers communication (for example, control messages and/or data) between the elements.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101. The processor 120 may be called a controller, or may include a controller as a part thereof or constitute a part of the controller.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to one or more of the application programs 147. For example, the middleware 143 may perform scheduling or load balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (for example, instruction) for file control, window control, image processing, text control, and the like.

The input/output interface 150 may function as, for example, an interface that may forward instructions or data, which are input from a user or another external device, to the other element(s) of the electronic device 101. Furthermore, the input/output interface 150 may output instructions or data, which are received from the other element(s) of the electronic device 101, to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of content (for example, text, images, videos, icons, or symbols) for the user. The display 160 may include a touch screen and may receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106). The communication interface 170 may include a Communication Processor (CP), and the communication processor may constitute one of a plurality of modules that constitute the communication interface 170. In one embodiment, the communication processor may also be included in the processor 120.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include, for example, at least one of Wi-Fi, Bluetooth, Near Field Communication (NFC), Magnetic Secure Transmission, Radio Frequency (RF), and Body Area Network (BAN). According to an embodiment, the wireless communication may include GNSS. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system) according to a used area or a bandwidth thereof. Hereinafter, in this document, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include at least one of a telecommunication network, such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

Figure 2:
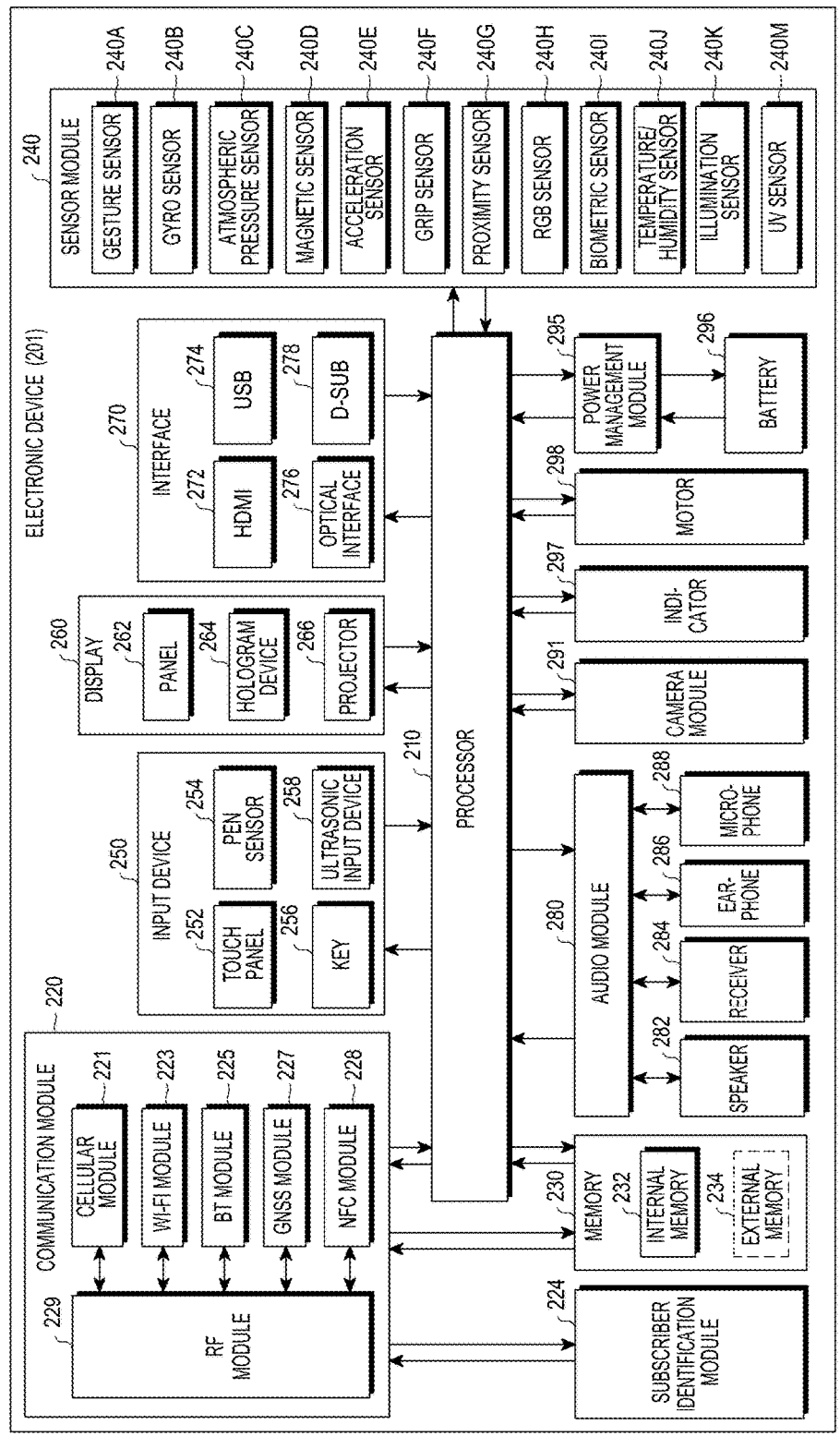
FIG. 2 is a block diagram of an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may further include one or more processors 210 (for example, Application Processors (APs)), a communication module 220, a Subscriber Identification Module (SIM) card 224, a memory 230, a sensor module 240, an input device 250, and a display 260, and may further at least one of an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may have, for example, a configuration equal or similar to that of the processor 120 of FIG. 1. The processor 210 may be embodied, for example, as a System on Chip (SoC). According to an embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory) to process the loaded instructions or data, and may store various types of data in the non-volatile memory.

The communication module 220 may have a configuration equal or similar to that of the communication interface 170 of FIG. 1. The communication module 220 may include, for example, at least one of a cellular module 221, a Wi-Fi module 223, a BT module 225, a GNSS module 227 (for example, a GPS module, a Glonass module, a Beidou module, or a Galileo module), an NFC module 228, and a Radio Frequency (RF) module 229.

The cellular module 221 may provide, for example, a voice call, a video call, a text message service, an Internet service, and the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, or the NFC module 228 may include, for example, a processor for processing data that is transmitted and received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (for example, an RF signal). The RF module 229 may include, for example, a transceiver, a Power Amplifier Module (PAM), a frequency filter, a Low Noise Amplifier (LNA), an antenna, etc. According to another embodiment, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory, a NOR flash memory, and the like), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, and may further include at least one of a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may be, for example, a part of the touch panel or may include a separate recognition sheet. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, and may further include a hologram device 264, and/or a projector 266. The display 260 may include a configuration equal or similar to that of the display 160 of FIG. 1. The panel 262 may be implemented to be, for example, flexible, transparent, or wearable. The panel 262, together with the touch panel 252, may be implemented as one module. According to an embodiment, the panel 262 may include a pressure sensor (or a POS sensor) which may measure a strength of pressure of a user's touch. The pressure sensor may be implemented integratedly with the touch panel 252 or implemented by one or more sensors separated from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, at least one of a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, etc.

The camera module 291 is a device that can photograph a still image and a dynamic image. According to an embodiment, the camera module 291 may include one or more image sensors (for example, a front sensor or a rear sensor), a lens, an Image Signal Processor (ISP), or a flash (for example, an LED, a xenon lamp, etc.).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (for example, a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a particular state (for example, a booting state, a message state, a charging state, and the like) of the electronic device 201 or a part (for example, the processor 210) thereof. The motor 298 may convert an electrical signal into a mechanical vibration and may generate a vibration, a haptic effect, etc. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
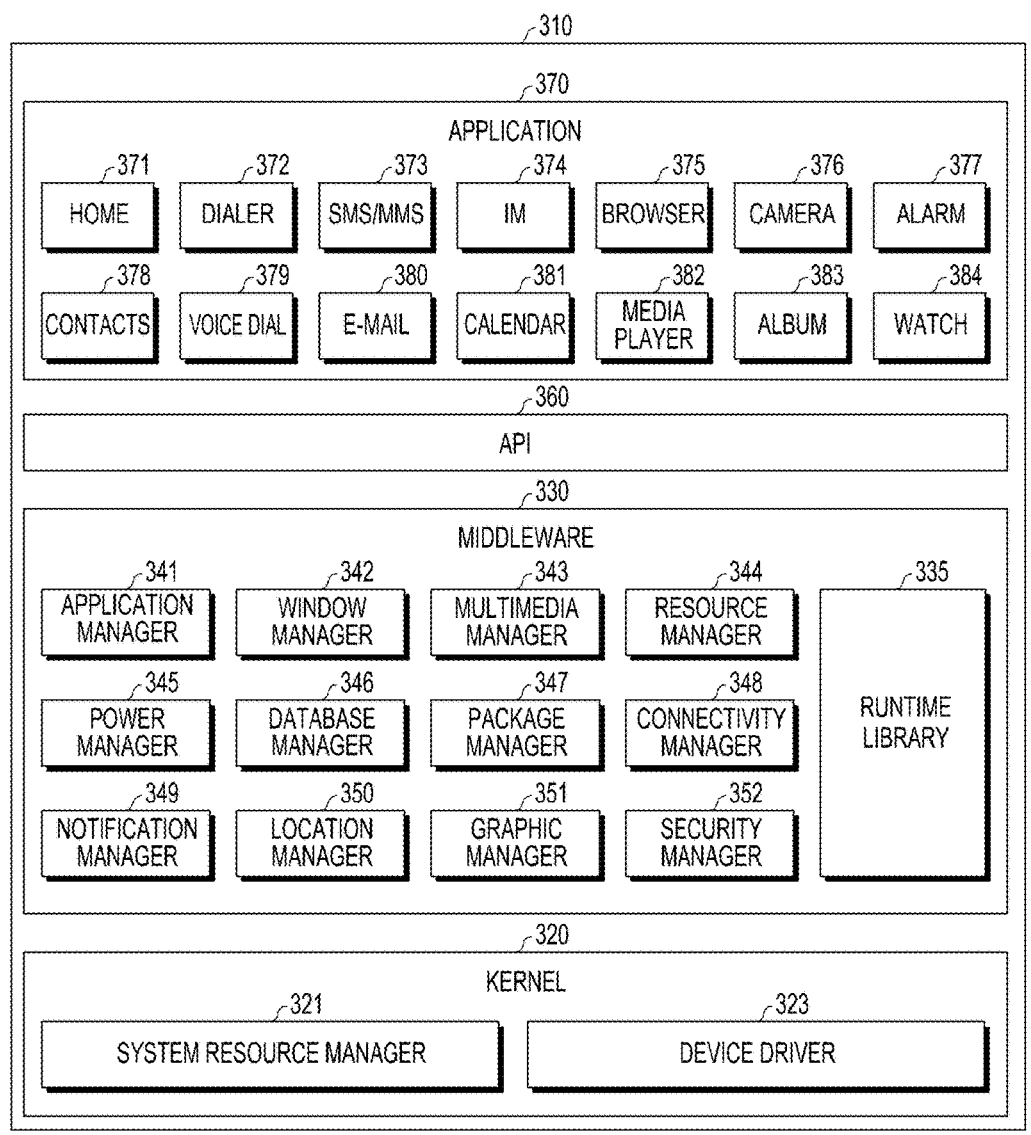
FIG. 3 is a block diagram of a program module according to various embodiments.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are executed in the operating system. The operating system may be, for example, Android™, iOS™, Windows™, Symbian™, Tizen™, Bada™, and the like.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104 or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, an advertising manager (notification manager) 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like.

The application manager 341 may manage, for example, the life cycle of at least one of the applications 370. The window manager 342 may manage Graphical User Interface (GUI) resources used on a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like, of at least one of the applications 370.

The power manager 345 may operate together with, for example, a Basic Input/Output System (BIOS) to manage a battery or power and provide power information required for the operation of the electronic device. The database manager 346 may generate, search for, or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The advertising manager 349 may display or notify of an event, such as an arrival message, an appointment, a proximity notification, and the like, in such a manner as not to disturb a user. The location manager 350 may manage location information of the electronic device. The graphic manager 351 may manage a graphic effect to be provided to a user or a user interface relating to the graphic effect. The security manager 352 may provide various security functions required for system security, user authentication, etc. According to an embodiment, in a case where the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (for example, the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, watch 384, health care (for example, measuring exercise quantity or blood sugar), and environment information (for example, atmospheric pressure, humidity, temperature information, and the like).

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) that are specified according to attributes of an external electronic device (for example, the electronic device 102 or 104). According to an embodiment, the applications 370 may include an application received from the external electronic device (for example, the server 106, or the electronic device 102 or 104). According to an embodiment, the applications 370 may include preloaded applications or third-party applications that can be downloaded from a server. Names of the elements of the program module 310, according to the above-described embodiments of the present disclosure, may change depending on the type of OS.

According to various exemplary embodiments, at least some of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, or a process for performing one or more functions.

Figure 4:
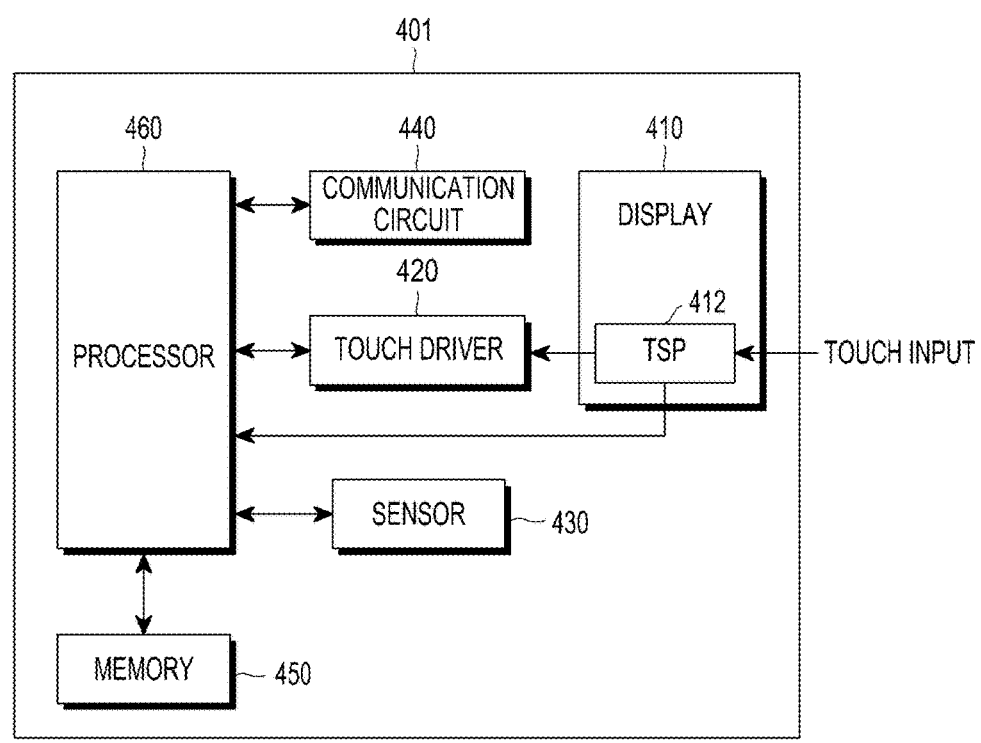
FIG. 4 is a block diagram of an electronic device according to various embodiments.

FIG. 4 is a block diagram of the electronic device according to various embodiments.

Referring to FIG. 4, an electronic device 401 may include, for example, at least one of a display 410, a touch driver 420, a sensor 430, a communication circuit 440, a memory 450, or a processor 460. The electronic device 401 may include some or all of the elements of the electronic device 101 or 201 illustrated in FIG. 1 or 2.

The display 410 may include, for example, a Touch Screen Panel (TSP) 412. The electronic device 401 (for example, the processor 460) may provide, for example, a user interface corresponding to various services (for example, a phone call, data transmission, broadcasting, or photographing) to the user through the display 410. Further, the electronic device 401 may transmit, for example, an (analog) signal corresponding to at least one touch input into the user interface, which is acquired through the touch screen panel 412, to at least one of the processor 460 and the touch driver 420. The touch screen panel 412 may receive at least one touch through, for example, a user's body (for example, a finger) or a touch input means (for example, a touch pen). Further, among at least one touch, the touch screen panel 412 may receive successive motion (for example, a drag, swipe, or continuous touch) of at least one touch. The electronic device 401 may transmit an (analog) signal corresponding to successive motions input through, for example, the touch screen 412 to at least one of the processor 460 and the touch driver 420.

According to various embodiments of the present disclosure, the term "touch" may include a touch by a direct physical touch with the touch screen panel 412, a hovering touch by a non-contact detected using the sensor 430 (for example, a proximity sensor or a grip sensor), a proximity touch, or a combination thereof. The touch by the physical contact may include, for example, a pressure touch. The touch by the non-contact is not limited to a contact between the touch screen panel 412 and the user's body (for example, the finger) or the touch input means (for example, the touch pen), and may acquire an input by a non-contact between the user's finger or the touch pen and the touch screen panel 412 within a predetermined interval. In the non-contact, an interval between the touch screen panel 412 and the touch input, which can be detected, may vary depending on the performance or a structure of the electronic device 401.

The touch screen panel 412 may be implemented, for example, in a resistive type, a capacitive type, an Electro Magnetic Resonance (EMR) type, an infrared type, or an acoustic wave type of touch screen, and also may be implemented in at least one combination thereof.

The touch screen panel 412 may be disposed on, for example, the front surface of the electronic device 401 and formed on at least a part of the front surface of the electronic device 401. Further, the touch screen panel 412 may be formed to occupy most of the front surface (for example, 90% or more of the front surface) of the electronic device 410. The touch screen panel 412 may include panels, for example, an LCD, an AMOLED, and the like, and may display various images according to a variety of operational states of the electronic device 401, the execution of an application, and/or a service.

The touch driver 420 may convert an analog signal received from, for example, the touch screen panel 412 into a digital signal (for example, X and/or Y coordinates) and transmit the digital signal to the processor 460.

According to an embodiment, the touch screen panel 412 may include a first touch panel and a second touch panel, and the touch driver 420 may include a first touch driver and a second touch driver. The first touch driver may convert an analog signal received by the detection of a finger or pen touch from the first touch panel into a digital signal (for example, X, Y, and/or Z coordinates) and transmit the digital signal to the processor 460. The second touch driver may convert an analog signal received by detection of a hovering touch and/or a proximity touch by a finger or a touch pen from the second touch panel into a digital signal and transmit the digital signal to the processor 460. The processor 460 may control the touch screen panel 412 according to one of a first input mode and a second input mode by using the digital signal received from each of the first and second touch drivers. For example, the processor 460 may display a preset type screen on the touch screen panel 412 in response to a touch by a physical contact between a finger or a touch pen and the touch screen panel 412 or a hovering touch or a proximity touch by a physical non-contact between a finger or a touch pen and the touch screen panel 412.

In the electronic device 401 according to an embodiment of the present disclosure, the first touch panel may detect a touch by a physical contact between a user's finger or a pen and the touch screen panel 412, and the second touch panel may detect a hovering touch or a proximity touch by a non-contact between a user's finger or a pen and the touch screen panel 412. Accordingly, the processor 460 of the electronic device 401 may distinguish between the touch by the physical contact between the user's finger or the pen and the touch screen panel 412 and the hovering touch or the proximity touch by the non-contact between the user's finger or the pen and the touch screen panel 412 within a predetermined interval. According to an embodiment, the sensor 430 may include a grip sensor, a proximity sensor, an acceleration sensor, a gyro sensor, a motion sensor, or a combination thereof.

The processor 460 may overall control the electronic device 401 according to various embodiments. The processor 460 may control, for example, the display 410 (for example, the touch screen panel 412) to operate in one of the first input mode and the second input mode.

The processor 460 may activate the touch screen panel 412 of the display 410 in the first input mode to acquire an input (hereinafter, referred to as a touch input) of a position (for example, X and Y coordinates) where the touch is actually generated through the touch screen panel 412 of the display 410. For example, the processor 460 may activate the touch screen panel 412 in the first input mode in accordance with the touch input. Further, the processor 460 may set, for example, the activated state of the touch screen panel 412 in the first input mode by default. The processor 460 may acquire a touch input of the position (for example, X and Y coordinates) where the touch is actually generated through the touch screen panel 412 activated in the first input mode.

Further, the processor 460 may activate, for example, the touch screen panel 412 of the display 410 in the second input mode to acquire an input of a position (for example, X' and Y' coordinates) on the touch screen panel 412 corresponding to the position (for example, x and y coordinates) where the touch is actually generated through one or more areas (hereinafter, referred to as a "navigating area") of the touch screen panel 412 of the display 410. For example, when context information associated with the electronic device 401 meets a predetermined condition for activating the touch screen panel 412 in the second input mode (hereafter, referred to as a "second input mode activation condition), the processor 460 may acquire a navigated input of the position (for example, X' and Y' coordinates) indirectly corresponding to the position (for example, x and y coordinates) where the actually generated touch is detected through at least some areas (for example, the navigating area) of the touch screen panel 412 of the display 410. For example, when the touch screen panel 412 activates in the second input mode, the processor 460 may receive a value (for example, a digital signal) of the position (for example, X' and Y' coordinates) on the touch screen panel 412 corresponding to the position (for example, X and Y coordinates) converted from the position (for example, x and y coordinates) where the touch is detected from the navigating area through the touch driver 420. The processor 460 may control the touch screen panel 412 by using the digital signal received from the touch driver 420.

Further, the processor 460 may perform selection, movement, enlargement, or reduction of an object (for example, a short-cut icon) (see FIGS. 7A to 7C) displayed on the touch screen panel 412, perform an operation for a combination thereof, or execute a function designated to the object in response to the touch generated by the user in the navigating area. Although FIG. 4 illustrates that the touch driver 420 and the processor 460 are separated from each other, the present disclosure is not limited thereto and the touch driver 420 may be integrated into the processor 460.

According to various embodiments of the present disclosure, the term "touch input" may refer to, when a touch is actually generated on the touch screen panel 412 or the navigating area corresponding to at least some areas of the touch screen panel 412, an input on the touch position (for example, X and Y coordinates) on the touch screen panel 412 where the touch is generated or the touch position (for example, x and y coordinates) on the navigating area, and the term "navigated input" refers to, when a touch is actually generated on the navigating area corresponding to one or more areas of the touch screen panel 412, an input of the position (for example, X' and Y' coordinates) on the touch screen panel 412 corresponding to the touch position (for example, x and y coordinates) on the navigating area where the touch is generated. Further, the touch input may include an input acquired by a touch by a direct physical contact with the touch screen panel 412 and an input acquired by a hovering touch and/or a proximity touch by a non-contact detected using the sensor 430 (for example, a proximity sensor or a grip sensor). The processor 460 may distinguish between the touch input (for example, a pressure touch) by the physical contact and the touch (for example, the hovering touch and/or the proximity touch) by the non-contact.

For example, when the touch screen panel 412 is activated in the first input mode and context information associated with the electronic device 401 meets a predetermine condition for activating the touch screen panel 412 in the second input mode (hereinafter, referred to as a "second input mode activation condition), the processor 460 may change the touch screen panel 412 from the first input mode to the second input mode. Inversely, for example, when the touch screen panel 412 is activated in the second input mode and context information associated with the electronic device 401 meets a predetermined condition for activating the touch screen panel 412 in the first input mode (hereinafter, referred to as a "first input mode activation condition"), the processor may change again the touch screen panel 412 from the second input mode to the first input mode. Further, for example, during the activation of the touch screen panel 412 in the second input mode, the processor 460 may determine whether the context information associated with the electronic device 401 meets a predetermined condition for deactivating (for example, disenabling) the second input mode (hereafter, referred to as a "second input mode deactivation condition). When the context information of the electronic device 401 meets the second input mode deactivation condition, the processor 460 may deactivate the second input mode of the touch screen panel 412.

According to an embodiment, the processor 460 may detect context information associated with the electronic device 401 (for example, a location or an attitude of the electronic device 401, a time preset to the electronic device 401, execution of a predetermined application or content, or a combination thereof) by using, for example, the display 410 (for example, the touch screen panel 412) or the sensor 430 (for example, the sensor module 240). The context information may further include voice information related to the context information of the electronic device 401. The processor 460 may receive information related to the context information of the electronic device 401 (for example, voice information) by using, for example, a voice input means (for example, the microphone 288).

The processor 460 may execute a function designated to at least one object (for example, icon) displayed on the touch screen panel 412 of the display 410 based on a touch input acquired through at least some areas (for example, the navigating area) of the touch screen panel 412 of the display 410 while the touch screen panel 412 of the display 410 is in the second input mode. For example, while the touch screen panel 412 of the display 410 is in the second input mode, the processor 460 may perform the function (for example, selecting, moving, enlarging or reducing the object, or a combination thereof) designated to at least one object displayed on the touch screen panel 412 of the display 410 or execute an application or a content corresponding to at least one object based on the navigated input on the touch screen panel 412 corresponding to the touch input acquired through the navigating area.

A method of activating (for example, enabling) the processor 460 in the second input mode and a method of detecting the navigated input of the display 410 in the second input mode will be described in detail with reference to FIGS. 5A to 7C.

Meanwhile, the electronic device 401 according to various embodiments may further include a communication circuit 440 (for example, the communication interface 170 or the communication module 220). The communication circuit 440 may perform communication with, for example, an external electronic device (for example, the external electronic device 102 or 104) through a predetermined scheme. The communication circuit 440 may receive a signal for information on the external electronic device 102 or 104. Further, the communication circuit 440 may transmit the signal for the information on the electronic device 401 to the external electronic device 102 or 104. For example, when the touch screen panel 412 of the display 410 is activated in the second input mode, the communication circuit 440 may transmit information on a representation for representing the navigating area to the user to the external electronic device 102 or 104 in order to acquire the touch input detected in the navigating area of the display 410 (for example, the touch screen panel 412) as the navigated input on the display 410 (for example, the touch screen panel 412) corresponding to the touch input. The external electronic device 102 or 104 may display the navigating area for navigating the touch screen panel 412 of the electronic device 401 in at least one area of the display (for example, the touch screen panel) of the external electronic device 102 or 104 based on information on the representation. Here, the communication circuit 440 may unicast, multicast, or broadcast the signal. The communication circuit 440 may communicate with a communication unit of the external electronic device 102 or 104 through Near Field Communication (NFC), ZigBee communication, infrared communication, visible light communication, Bluetooth communication, Bluetooth Low Energy (BLE) scheme, or the like.

The above-described communication schemes are merely examples, and the scope of the embodiments of the present disclosure is not limited to a specific communication scheme that is performed by the communication circuit 440.

The memory 450 may store signals or data input/output in accordance with operations of various modules including the sensor module (for example, the sensor module 240) or the display (for example, the display 410 or 260) under, for example, a control of the processor 460. The memory 450 may store control programs and/or applications for controlling the electronic device 401 or the processor 460.

According to various embodiments, although all elements of the display 410, the touch screen panel 412, the touch driver 420, the sensor 430, the communication circuit 440, the memory 450, or the processor 460 are illustrated as elements included in one electronic device 401, various embodiments are not limited thereto. For example, according to a role, a function, or a capability of the electronic device 401, at least some of the elements of the display 410, the touch screen panel 412, the touch driver 420, the sensor 430, the communication circuit 440, the memory 450, or the processor 460 may be implemented to be distributed to the electronic device 401 and the external electronic device (for example, the first external electronic device 102, the second external electronic device 104, or the server 106 of FIG. 1).

Figure 5A:
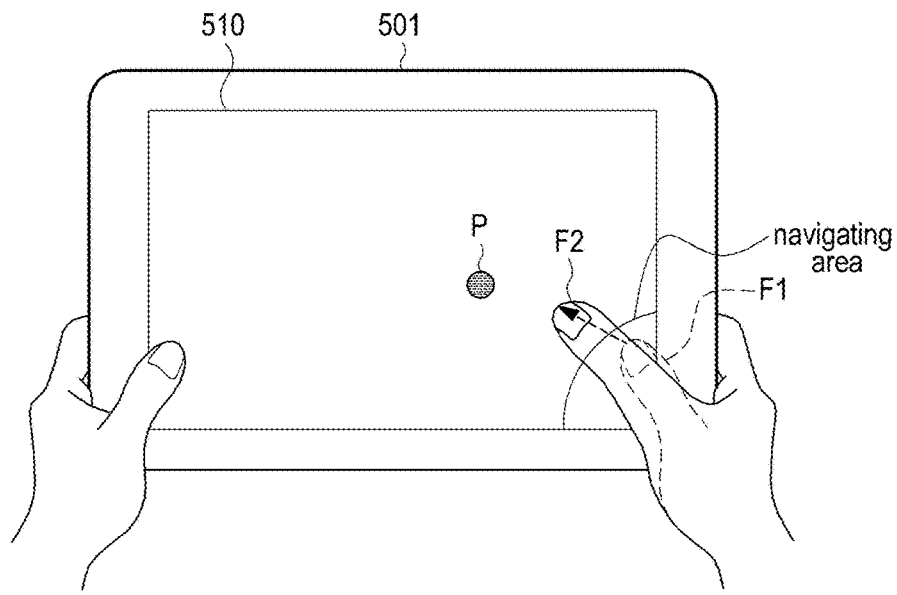
FIGS. 5A and 5B illustrate examples of an interface for an adaptive touch input using a display of an electronic device according to various embodiments.
Figure 5B:
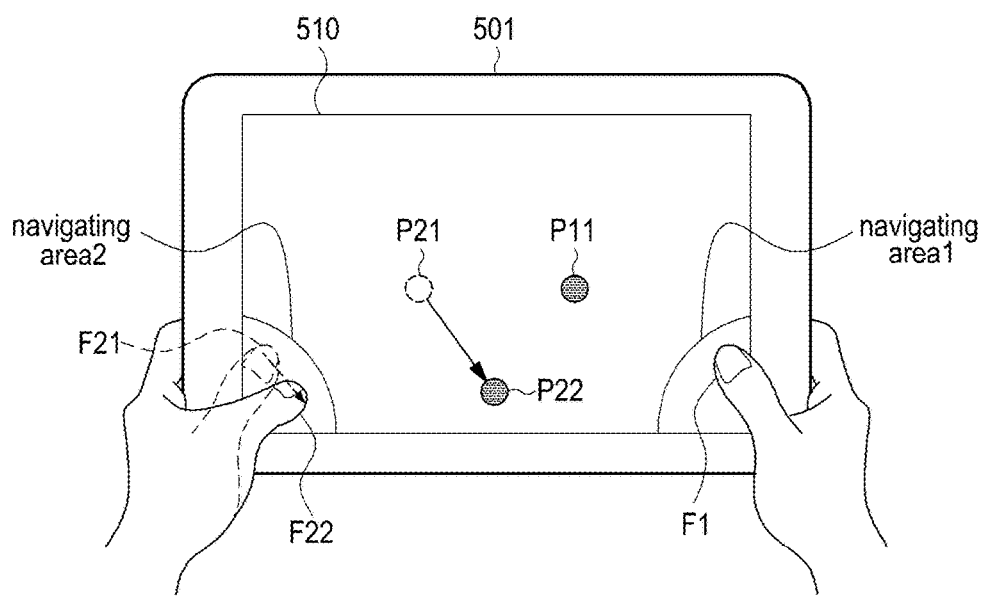

FIGS. 5A and 5B illustrate examples of an interface for an adaptive touch input using a display of an electronic device according to various embodiments.

For example, FIG. 5A illustrates an example of an operation of enabling an input pointer through an enabled input navigation function when a display 510 of an electronic device 501 changes to the second input mode, and FIG. 5B illustrates an example of an operation of detecting a navigated input through an input navigation function while the display (for example, the display 410) of the electronic device 501 is in the second input mode.

Referring to FIG. 5A, the electronic device 501 or the processor (for example, the processor 460) of the electronic device 501 may identify context information of the electronic device 501 detected through, for example, the display 510 or the sensor (for example, the sensor 430) or input through a voice input means (for example, the microphone 288), and, when the context information meets a predetermined condition (for example, a second input mode activation condition), activate (for example, enable) an input navigation function by activating the display 510 in the second input mode.

For example, when the input navigation function is enabled, the electronic device 501 may determine whether a predetermined operation is performed. For example, the predetermined operation may include an operation of setting at least a portion of the area of the display 510 as a navigating area for the input navigation function when the display 510 is activated in the second mode. The electronic device 501 may display, for example, various types of visual representations on the display 510 to allow the user to recognize the set navigating area.

For example, when the input navigation function is enabled, the electronic device 501 may activate (for example, enable) an input pointer indicating the navigated input detected using the input navigation function through various methods.

According to an embodiment, the electronic device 501 may determine whether a preset operation is performed to enable the input pointer. For example, the preset operation to enable the input pointer may include an operation of performing a dragging from the inside of the navigating area by a touch finger F1 to the outside of the navigating area by a finger F2 as illustrated in FIG. 5A. The electronic device 501 may determine whether, for example, the preset operation (for example, the operation of performing the touch (for example, by the finger F1) within the navigating area and performing the dragging (for example, by the finger F2) to the outside of the navigating area as illustrated in FIG. 5A) is performed and, when the preset operation is performed, enable the input pointer P by displaying the input pointer P indicating the navigated input on the touch screen panel on the display 510 in response to the touch input detected in the navigating area.

According to an embodiment, the electronic device 501 may determine whether a physical motion or a position of the electronic device 501 that is preset for enabling the input pointer P is detected, and may enable the input pointer P. For example, the electronic device 501 may set an operation of shaking the electronic device 501 in a particular direction (for example, an upward and downward direction or a left and right direction) by a predetermined number of times as the physical motion preset for enabling the input pointer P. Alternatively, the electronic device 501 may set a particular position of the electronic device 501 (for example, a first axis of the electronic device 501 is located at a particular angle) as the position of the electronic device preset for enabling the input pointer P. When it is determined that a physical motion of the electronic device 501 corresponds to the physical motion preset for enabling the input pointer P, the electronic device may enable the input pointer P by displaying, on the display 510, the input pointer P indicating the navigated input on the touch screen panel corresponding to the touch input detected in the navigating area. Alternatively, when it is determined that the position of the electronic device 501 corresponds to the position preset for enabling the input pointer P, the electronic device 501 may enable the input pointer P by displaying, on the display 510, the input pointer P indicating the navigated input on the display 510 corresponding to the touch input detected in the navigating area.

According to an embodiment, the electronic device 501 may determine whether a preset particular type touch action for enabling the input pointer P or a preset particular type touch is detected and may enable the touch pointer P. For example, when continuous touches are set as the preset particular type touch for enabling the input pointer P, the electronic device 501 may determine whether the continuous touches are detected and, when the continuous touches are detected, display, on the display 510, the input pointer P for detecting the navigated input on the touch screen panel corresponding to the touch input detected in the navigating area. Alternatively, when the preset particular type of touch for enabling the input pointer P is set as a non-contact touch, such as a hovering touch or a proximity touch, the electronic device 501 may determine whether the non-contact touch, such as the hovering touch or the proximity touch, is detected and, when the non-contact touch such as the hovering touch or the proximity touch is detected, may display, on the display 510, the input pointer P for detecting the navigated input on the display 510 corresponding to the touch input detected in the navigating area. Alternatively, when the preset particular type touch for enabling the input pointer P is set as a touch by a physical contact such as a pressure touch, the electronic device 501 may determine whether the touch by the physical contact such as the pressure touch is detected and, when the touch by the physical contact such as the pressure touch is detected, may display, on the display 510, the input pointer P for detecting the navigated input on the display 510 corresponding to the touch input detected in the navigating area.

According to an embodiment, the touch input detected in the navigating area may include a touch input (for example, a pressure touch input) acquired by a touch (for example, a pressure touch) by a physical contact with the navigating area, a touch input (for example, a hovering touch input or a proximity touch input) acquired by a touch (for example, a hovering touch or a proximity touch) by a non-contact within a predetermined interval from the navigating area through a grip sensor or a proximity sensor, or a combination thereof.

Meanwhile, although FIG. 5 illustrates only one navigating area, the present disclosure is not limited thereto and one or more navigating areas may be set by the user. Further, although FIG. 5 illustrates one input pointer P corresponding to the one navigating area, the present disclosure is not limited thereto and a plurality of input pointers corresponding to a plurality of navigating areas may be enabled. When a plurality of input pointers are enabled, the electronic device 501 may display the input pointers to be distinguished from each other.

Referring to FIG. 5B, two navigating areas (navigating area 1 and navigating area 2) are illustrated. Although FIG. 5B illustrates that the navigating areas (navigating area 1 and navigating area 2) are formed at locations corresponding to fingers (for example, thumbs) of both hands when the user grasps the electronic device with both hands, the present disclosure is not limited thereto and, when input pointer enabling operations input by a plurality of users are performed, a plurality of navigating areas formed at a plurality of locations corresponding to the input pointer enabling operations may be displayed. Although FIG. 5B illustrates the same shaped (for example, a circle shape) input pointers P11 and P22 (P21) corresponding to the two navigating areas (navigating area 1 and navigating area 2), the present disclosure is not limited thereto, and the two input pointers P11 and P22 (P21) may be displayed in different shapes to be distinguished from each other.

The processor of the electronic device 501 may control the corresponding input pointers P11 and P22 (P21) for detecting the navigated inputs on the display 510 of the electronic device 501 to move in accordance with the touch inputs detected according to a movement of a user's finger or a touch pen within the navigating areas (navigating area 1 and navigating area 2).

For example, as illustrated in FIG. 5B, the electronic device 501 may display the first input pointer P11 at a location of the navigated input on the display 510 of the electronic device 501 in accordance with a location of a touch input by the finger F1 within the first navigating area (navigating area 1). Similarly, the second input pointer P21 may be displayed at a location of the navigated input on the display 510 of the electronic device 501 in accordance with a location of a touch input by a finger F21 within the second navigating area (navigating area 2). For example, the electronic device 501 may control the second input pointer P21 to move to the location of the second input pointer P22 as the location of the finger F21 moves to the location of the finger F22 within the second navigating area (navigating area 2). At this time, a distance by which the finger moves within the second navigating area (navigating area 2) (a distance from F21 to F22) may be different from a distance by which the second input pointer P21 moves to the second input pointer P22 (a distance from P21 to P22), and thus the electronic device 501 may provide settings for controlling distance sensitivity.

FIGS. 6A to 6D illustrate examples of an interface for an adaptive touch input using a display of an electronic device according to various embodiments.

Figure 6A:
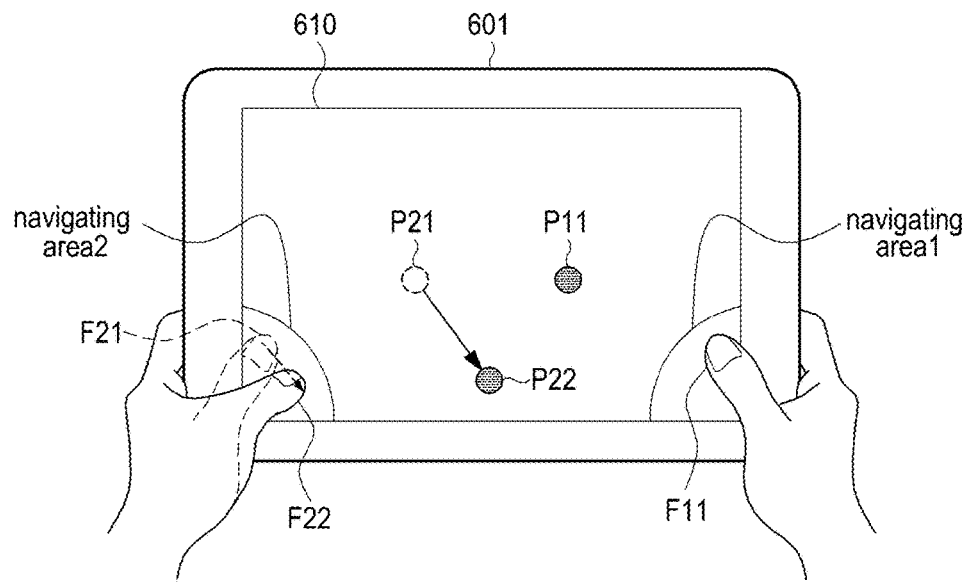
FIGS. 6A to 6D illustrate examples of an interface for an adaptive touch input using a display of an electronic device according to various embodiments.

FIG. 6A illustrates an example of an operation of detecting a navigated input when a navigating area in which the electronic device 601 or the processor (for example, the processor 460) detects the navigated input through an input navigation function is not limited. For example, when the electronic device 601 receives an input through a hovering touch instead of a touch by a direct physical contact, the navigating area may not be limited as illustrated in FIG. 6A. The touch input within the navigating area is the touch input by the hovering touch, and the navigated input using the input navigation function can be detected through a method that is the same as or similar to that described in FIG. 5B except that the navigating area is not limited. Accordingly, a detailed description thereof will be replaced with the description in FIG. 5B.

Figure 6B:
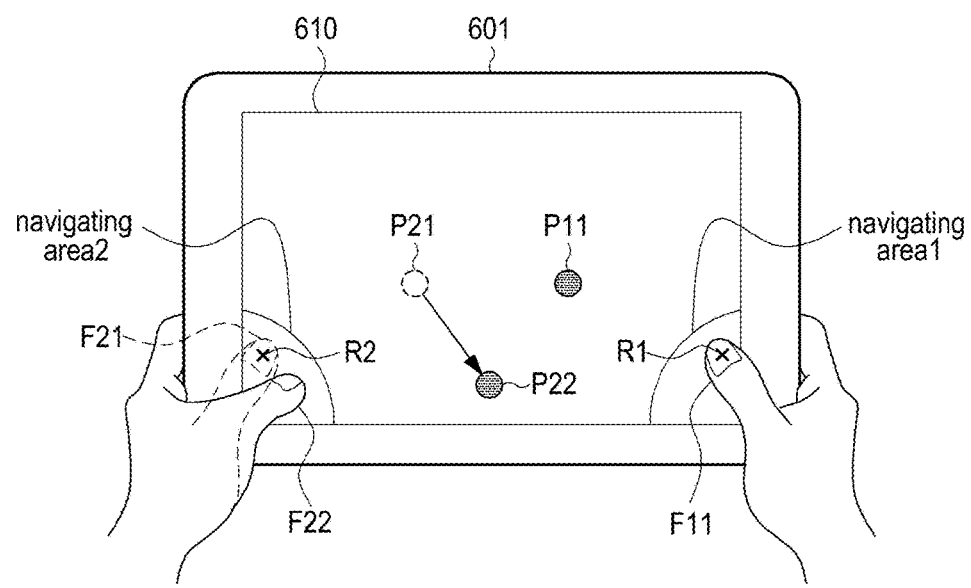

FIG. 6B illustrates an example of an operation of detecting a navigated input through an input navigation function based on a reference point. Compared to FIG. 5B, the navigated input may be detected based on reference points R1 and R2 instead of the navigated area in FIG. 6B.

Referring to FIG. 6B, two reference points R1 and R2 are illustrated. Although FIG. 6B illustrates the two reference points R1 and R2 formed at locations corresponding to fingers (for example, thumbs) of both hands when the user grasps the electronic device with both hands, the present disclosure is not limited thereto and a plurality of reference points formed at a plurality of locations may be displayed when input pointer enabling operations input from a plurality of users are performed. Although FIG. 6 illustrates that input pointers P11 and P22 (P21) corresponding to the two reference points R1 and R2 have the same shape (for example, a circular shape), the present disclosure is not limited thereto and the two input pointers P11 and P22 (P21) may be displayed in different shapes to be distinguished from each other.

The electronic device 601 may control the corresponding input pointers P11 and P22 (P21) for detecting the navigated inputs on the display 610 of the electronic device 601 to move in accordance with detected touch inputs in response to the movement of a user's finger or a touch pen based on the reference points R1 and R2.

For example, as illustrated in FIG. 6B, the electronic device 601 may display a first input pointer P11 at a location of a navigated input on the display 610 of the electronic device 601 in accordance with a location of a touch input made by a finger F1 based on a first reference point R1. The reference point R1 may be included, for example, a first navigating area (navigating area 1). Similarly, the electronic device 601 may display a second input pointer P21 at a location of a navigated input on the display 610 of the electronic device 601 in accordance with a touch input made by a finger F21 based on a second reference point R2. The second reference point R2 may be included, for example, in a second navigating area (navigating area 2). For example, the electronic device 601 may control the second input pointer P21 to move to the location of the second input pointer P22 as the location of the finger F21 moves to the location of the finger F22 based on the second reference point R2. At this time, a distance by which the finger moves based on the second reference point R2 (a distance from F21 to F22) may be different from a distance by which the second input pointer P21 moves to the second input pointer P22 (a distance from P21 to P22), and thus the electronic device 601 may provide settings for controlling distance sensitivity.

According to an embodiment, when no touch input is detected based on the reference points R1 and R2 within the navigating areas (navigating area 1 and navigating area 2) for a predetermined time, the electronic device 601 may invalidate the reference points. Thereafter, when a touch input is detected within the navigating areas (navigating area 1 and navigating area 2) after a predetermined time, the electronic device 601 may set a location of the detected touch input as a new reference point.

Figure 6C:
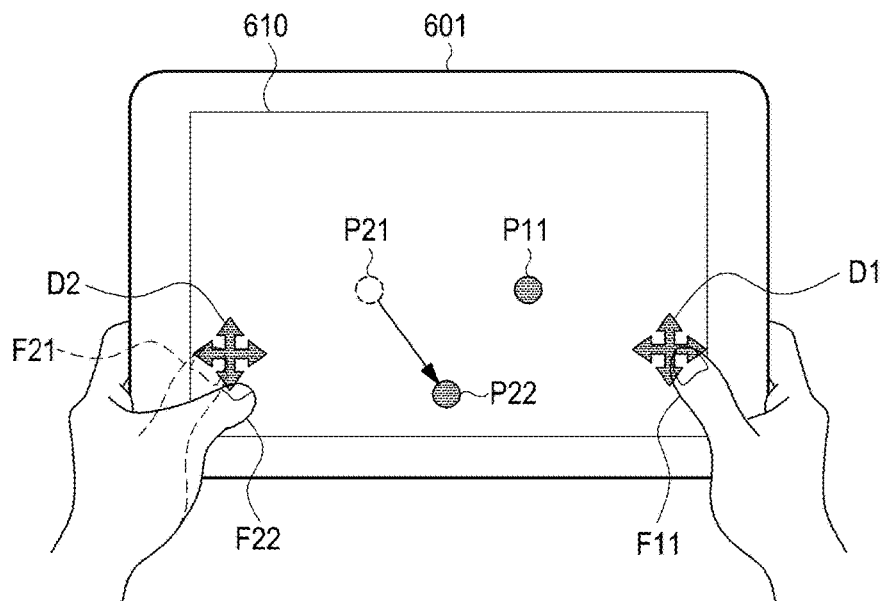

FIG. 6C illustrates an example of an operation of detecting a navigated input through an input navigation function based on a direction controller. Compared to FIG. 6B, the navigated input may be detected based on direction controller D1 and D2, such as a joystick, instead of the reference point in FIG. 6C.

Referring to FIG. 6C, two direction controllers D1 and D2 are illustrated. Although FIG. 6C illustrates the direction controllers D1 and D2 formed at locations corresponding to fingers (for example, thumbs) of both hands when the user grasps the electronic device with both hands, the present disclosure is not limited thereto and a plurality of direction controllers formed at a plurality of locations may be displayed when input pointer enabling operations input from a plurality of users are performed. Although FIG. 6C illustrates that two input pointers P11 and P22 (P21) corresponding to the two direction controllers D1 and D2 have the same shape (for example, a circular shape), the present disclosure is not limited thereto and the two input pointers P11 and P22 (P21) may be displayed in different shapes to be distinguished from each other.

The electronic device 601 may control the corresponding input pointers P11 and P22 (P21) to move in accordance with movement of a user's finger or a touch pen through, for example, the direction controllers D1 and D2.

For example, as illustrated in FIG. 6C, the processor 460 may display a first input pointer P11 at a location of a navigated input on the display 610 of the electronic device 601 in accordance with a location of a touch input made by a finger F11 based on a first direction controller D1. Similarly, the electronic device 601 may display a second input pointer P21 at a location of a navigated input on the display 610 of the electronic device 601 in accordance with a location of a touch input made by a finger P21 based on, for example, a second direction controller D2. For example, the electronic device 601 may control the second input pointer P21 to move to the second input pointer P22 as the location of the finger F21, of which the direction has been controlled by controlling the second direction controller D2, is moved to the location of the finger F22. At this time, a distance by which the finger controlled using the direction controller D2 moves (a distance from F21 to F22) may be different from a distance by which the second input pointer P21 moves to the second input pointer P22 (a distance from P21 to P22), and thus the electronic device 601 may provide settings for controlling distance sensitivity.

Figure 6D:
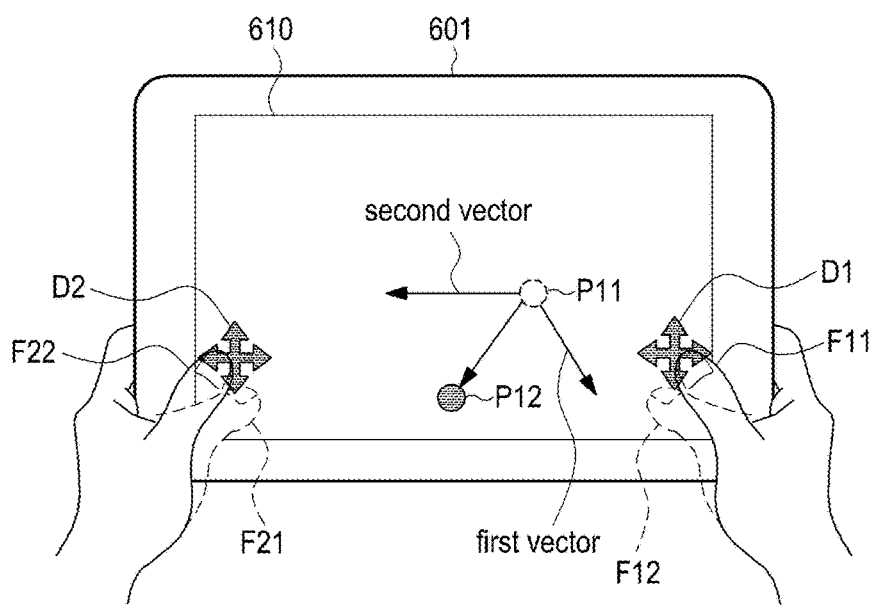

FIG. 6D illustrates an example of an operation of detecting a navigated input by controlling one input pointer P11 through two direction controllers D1 and D2 when the user grasps the electronic device with both hands. For example, a location of the one input pointer P11 may be determined at least based on a sum of vectors moved by the two direction controllers D1 and D2. For example, when the user desires to move the input pointer P11 to the input pointer P12, the user may touch the first direction controller D1 in a downward direction (for example, the finger F12) and the second direction controller D2 in a leftward direction (for example, the finger F22), and thus distances that move in opposite directions may be reduced. As a result, the input pointer P11 may be moved to the location of the input pointer P12. The electronic device 601 may determine, for example, the location of the one input pointer P12 by (adding first and second vectors) using a first vector corresponding to the first direction controller D1 and a second vector corresponding to the second direction controller D2. For example, the first vector may include information generated as the location of the direction-controlled finger F11 moves to the location of the finger F12, and the second vector may include information generated as the location of the direction-controlled finger F21 moves to the location of the finger F22.

Figure 7A:
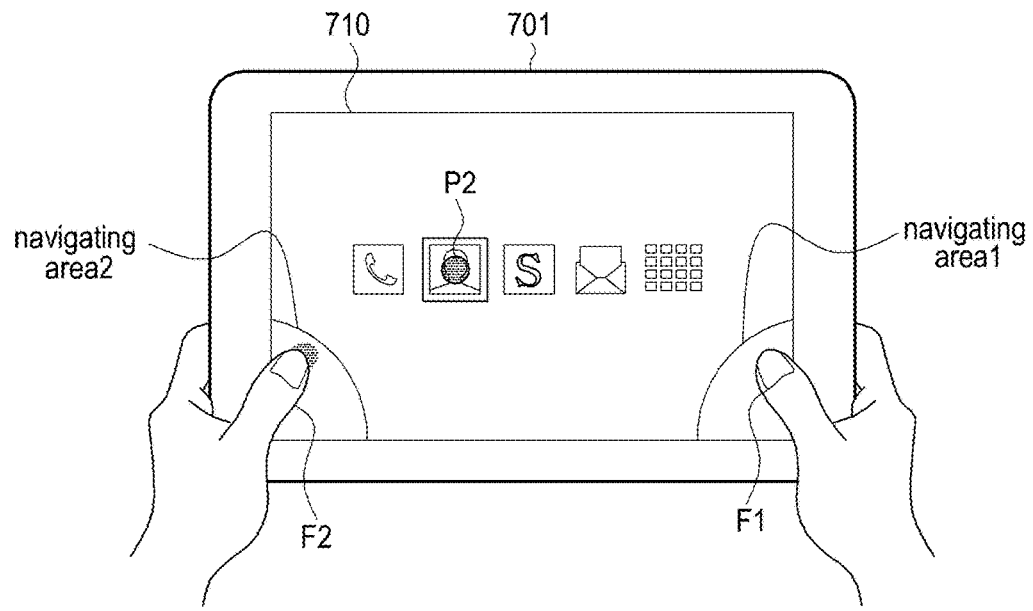
FIGS. 7A to 7C illustrate examples of an interface for an adaptive touch input using a display of an electronic device according to various embodiments.
Figure 7B:
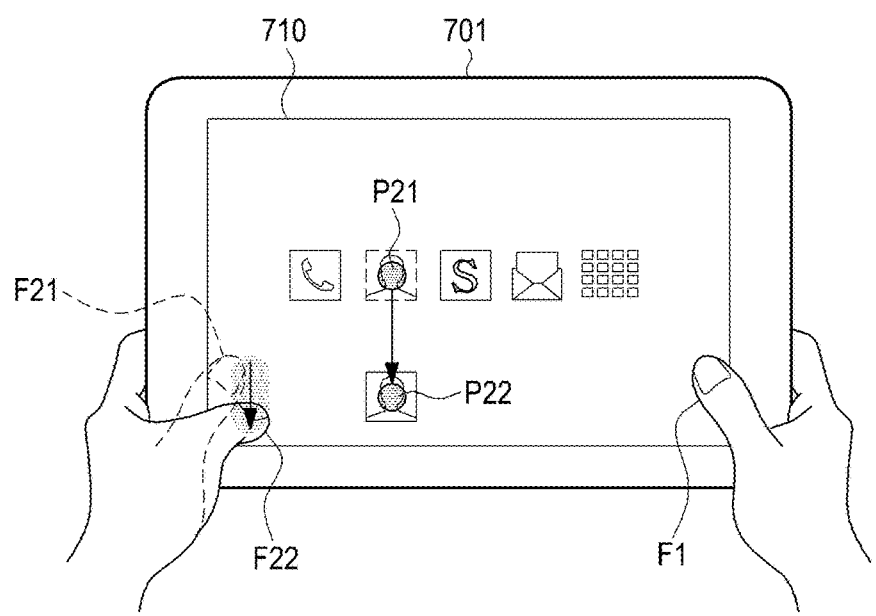
Figure 7C:
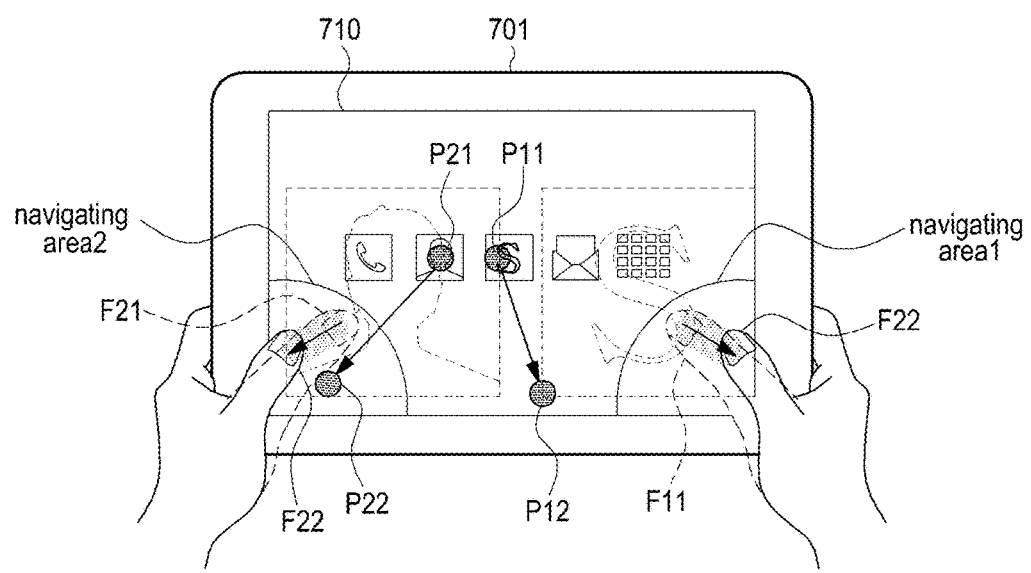

FIGS. 7A to 7C illustrate examples of an interface for an adaptive touch input using a display of an electronic device according to various embodiments. For example, FIGS. 7A to 7C illustrate examples of an operation of performing a predetermined function at a location of an input pointer P1 controlled to detect a navigated input on a display 710 in accordance with a touch input detected through one or more areas (for example, navigating areas) of the display 710 when the display 710 of an electronic device 701 is activated in a second input mode through an input navigation function.

Referring to FIG. 7A, the electronic device 701 may move the location of the input pointer P1 for detecting the navigated input on the display 710 to a desired position in response to a touch input detected within a second navigating area (navigating area 2) through the input navigation function, so as to detect the navigated input at the corresponding position. For example, the electronic device 701 moves to a position P2 where a short-cut icon indicating an address book is located among a plurality of short-cut icons displayed on the display 710 through the input navigation function, and then detects a navigated input at the position where the corresponding short-cut icon is located. For example, when the navigated input is detected, the electronic device 701 may perform a function pre-designated to the corresponding short-cut icon (for example, execute an address book-related application).

Referring to FIG. 7B, the electronic device 701 may detect a navigated input on the display 710 in response to a touch input of a particular touch action (for example, a drag & drop) detected within the navigating area through the input navigation function. For example, when the electronic device 701 detects a touch input of a drag and drop action from a location of a finger F21 to a location of a finger F22 within the navigating area (for example, when the navigating area is not limited), the electronic device 701 may detect a navigated input of a drag and drop action from an input pointer P21 to an input pointer P22 on the display 710 in response to the touch input of the drag & drop action. For example, when the user desires to change the location of the short-cut icon indicating an address book function among the plurality of short-cut icons, the electronic device 701 may detect a navigated input corresponding to the drag & drop operation to move the short-cut icon from the originally located position P21 to the desired position P22. When the touch input corresponding to the drag & drop action is detected within the navigating area, the electronic device 701 may change the location of the corresponding short-cut icon on the display 710 to a location of a movement distance (for example, a movement distance from P21 to P22) and/or a direction of the input pointer on the display 710 corresponding to a movement distance (for example, a distance from F21 to F22) and/or a direction of the finger within the navigating area.

Referring to FIG. 7C, after moving to the location of the corresponding input pointer P11 or P21 to the desired position (for example, P12 or P22) through the input navigation function, the electronic device 701 may acquire a navigated touch input corresponding to a particular touch action (for example, zoom-in) at the corresponding position (for example, P12 or P22). For example, when the user desires to zoom in a short-cut icon indicating an address book function among a plurality of short-cut icons, the processor 460 may generate a touch action corresponding to a zoom-in function of the corresponding short-cut icon in the second navigating area (navigating area 2). When the touch action corresponding to the zoom-in function (for example, a drag action from the location of the finger F21 to the location of the finger F22) is generated within the second navigating area (navigating area 2), the processor 460 may zoom in and enlarge the corresponding short-cut icon on the touch screen panel 710 to be the size corresponding to a movement distance and a direction (for example, a distance and a direction from F21 to F25) of the finger within the corresponding navigating area (navigating area 2). Although not illustrated, when a touch action corresponding to a zoom-out function is generated with the navigating area (navigating area 1 or navigating area 2), a corresponding short-cut icon on the touch screen panel 710 may be zoomed out and reduced in a similar way.

According to various embodiments, an electronic device may include: a display; a sensor; and a processor, wherein the processor may be configured to activate the display in a first input mode to acquire a first touch input through the display, to identify context information related to the electronic device through the display or the sensor, to change the display to a second input mode to acquire a second touch input through at least some areas of the display when the context information meets a predetermined condition, and to execute a predetermined function related to at least one object displayed on the display based on the second touch input acquired through the at least some areas while the display is in the second input mode.

According to various embodiments, the processor may be configured to display a representation indicating the one or more areas that have changed to the second input mode on the display.

According to various embodiments, the processor may be configured to display at least one representation corresponding to the second touch input on an external electronic device.

According to various embodiments, the sensor may include a microphone, and the processor may be configured to acquire voice information related to the context information of the electronic device through the microphone and to change the display from the first input mode to the second input mode based on the acquired voice information.

According to various embodiments, the processor may be configured to deactivate (disenable) the second input mode when the first touch input is acquired through the at least some areas while the display is in the second input mode.

According to various embodiments, the processor may be configured to perform another predetermined function different from the predetermined function when the first touch input is acquired through the at least some areas while the display is in the second input mode.

According to various embodiments, the context information may include a location and a position of the electronic device, a time preset to the electronic device, execution of a predetermined application or content, or a combination thereof.

According to various embodiments, the first touch input and the second touch input may include a hovering touch input, a proximity touch input, a pressure touch input, or a combination thereof.

According to various embodiments, the processor may be configured to perform selection or movement of the object, enlargement or reduction of at least a part of the object, or a combination thereof as at least a part of the predetermined function.

According to various embodiments, the processor may be configured to execute an application corresponding to the object as at least a part of the predetermined function.

According to various embodiments, the processor may be configured to display, on the display, at least one input pointer indicating the second touch input acquired through the at least some areas while the display is in the second input mode.

Figure 8:
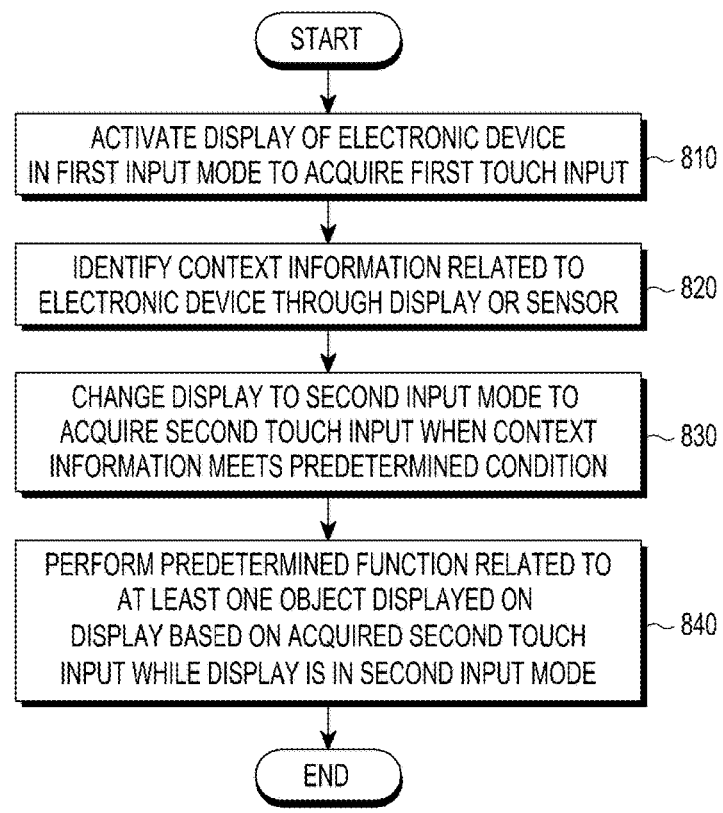
FIG. 8 is a flowchart illustrating an adaptive touch input method using a display of an electronic device according to various embodiments.

FIG. 8 is a flowchart illustrating an adaptive touch input method using a display of an electronic device according to various embodiments. The adaptive touch input method using the display of the electronic device may include operations 810 to 840. The adaptive touch input method using the display of the electronic device may be performed by at least one of the electronic device (for example, the electronic device 401) and the processor (for example, the processor 460) of the electronic device.

In operation 810, for example, the electronic device may activate the display in a first input mode to acquire a first touch input through the display (for example, the touch screen panel). For example, the electronic device may activate the touch screen panel of the display in the first input mode to acquire the first touch input at a position (for example, x and y coordinates) where the touch is actually generated through the touch screen panel of the display. The electronic device may acquire the first touch input at the position (for example, x and y coordinates) where the actually generated touch is detected through the touch screen panel activated in the first input mode.

According to an embodiment, the first touch input may include, for example, a touch input (for example, a pressure touch input) acquired by a touch (for example, a pressure touch) by a physical contact with the touch screen panel of the display, a touch input (for example, a hovering touch input or a proximity touch input) acquired by a touch (for example, a hovering touch or a proximity touch) by a non-contact within a predetermined interval from the touch screen panel of the display through a grip sensor or a proximity sensor, or a combination thereof.

According to an embodiment, the electronic device may set the activated state of the touch screen panel in the first input mode by default.

In operation 820, for example, the electronic device may identify context information related to the electronic device through the display (for example, the touch screen panel) or the sensor (for example, a grip sensor, a proximity sensor, an acceleration sensor, a gyro sensor, or a motion sensor). For example, the electronic device may detect a first touch input for a touch generated on the display through the touch screen panel of the display and/or a first touch action (for example, a touch, continuous touches, a drag & drop, zoom-in, zoom-out, or swiping) generated on the touch screen panel of the display.

According to an embodiment, the electronic device may detect a location or a position of the electronic device through, for example, the acceleration sensor or the gyro sensor. Further, the electronic device may detect a motion (movement) of the electronic device through, for example, the motion sensor.

As described above, the electronic device may detect various pieces of context information related to the electronic device through the touch screen panel of the display or various sensors of the electronic device. The electronic device may periodically or aperiodically perform operation 820.

According to an embodiment, the context information may include a location and an attitude of the electronic device, a preset time to the electronic device, an execution of a predetermined application or content, or a combination thereof. Further, the context information may further include voice information. For example, the electronic device may receive context information (for example, voice information) related to the electronic device through a voice input means (for example, a microphone).

In operation 830, for example, when the context information meets a predetermined condition (hereinafter, a "second input mode activation condition") to activate the display (for example, the touch screen panel) in the second input mode, the electronic device may activate the display in the second input mode to acquire a second touch input of a position (for example, x and y coordinates) where the touch is actually generated through at least some areas (for example, navigating areas) of the display.

According to an embodiment, the electronic device may detect, for example, a second touch input for the touch generated on the display through the touch screen panel of the display and/or a second touch action (for example, a touch, continuous touches, a drag & drop, zoom-in, zoom-out, or swiping) generated on the touch screen panel of the display.

According to an embodiment, the second touch input may include, for example, a touch input (for example, a pressure touch input) acquired by a touch (for example, a pressure touch) by a physical contact with at least some areas (for example, navigating areas) of the display, a touch input (for example, a hovering touch input or a proximity touch input) acquired by a touch (for example, a hovering touch or a proximity touch) by a non-contact within a predetermined interval from at least some areas (for example, navigating areas) of the display through a grip sensor or a proximity sensor, or a combination thereof.

According to an embodiment, the electronic device may determine whether the detected context information meets the second input mode activation condition. For example, the electronic device may designate or store in advance at least one context related to the electronic device corresponding to the second input mode activation condition. For example, when the detected context information corresponds to the predesignated (and/or pre-stored) context in accordance with the second input mode activation condition, the electronic device may determine that the second input mode activation condition is met.

According to an embodiment, when the location of the electronic device in the detected context information corresponds to the predesignated location in accordance with the second input mode activation condition, the electronic device may determine that the detected context information meets the second input mode activation condition.

According to an embodiment, when the position of the electronic device in the detected context information corresponds to the predesignated position in accordance with the second input mode activation condition, the electronic device may determine that the detected context information meets the second input mode activation condition.

According to an embodiment, when the electronic device reaches a preset time in accordance with the second input mode activation condition in the detected context information, the electronic device may determine that the detected context information meets the second input mode activation condition.

According to an embodiment, when an executed application or content in the detected context information corresponds to the predesignated application or content in accordance with the second input mode activation condition, the electronic device may determine that the detected context information meets the second input mode activation condition.

According to an embodiment, when voice information input through a voice input means (for example, a microphone) in the detected context information corresponds to predesignated voice information in accordance with the second input mode activation condition, the electronic device may determine that the detected context information meets the second input mode activation condition.

As described above, when various pieces of context information correspond to predesignated context in accordance with the second input mode activation condition, the electronic device may determine that the detected context information meets the second input mode activation condition and activate the display in the second input mode, or, when the display is activated in the first input mode, may change the display from the first input mode to the second input mode.

In operation 840, for example, while the display (for example, the touch screen panel) operates in the second input mode, the electronic device may execute a designated function related to at least one object (for example, short-cut icon) displayed on the display based on the second touch input acquired through at least some areas (for example, navigating areas). The electronic device may acquire an input (for example, a navigated input) of a position (for example, X' and Y' coordinates) on the display corresponding to the acquired second touch input (for example, x and y coordinates). For example, the electronic device may perform a function predesignated to at least one object corresponding to the navigated input.

Meanwhile, according to an embodiment, for example, when the electronic device acquires the first touch input through at least some areas while the display is in the second input mode, the electronic device may deactivate (for example, disenable) the second input mode.

Figure 9:
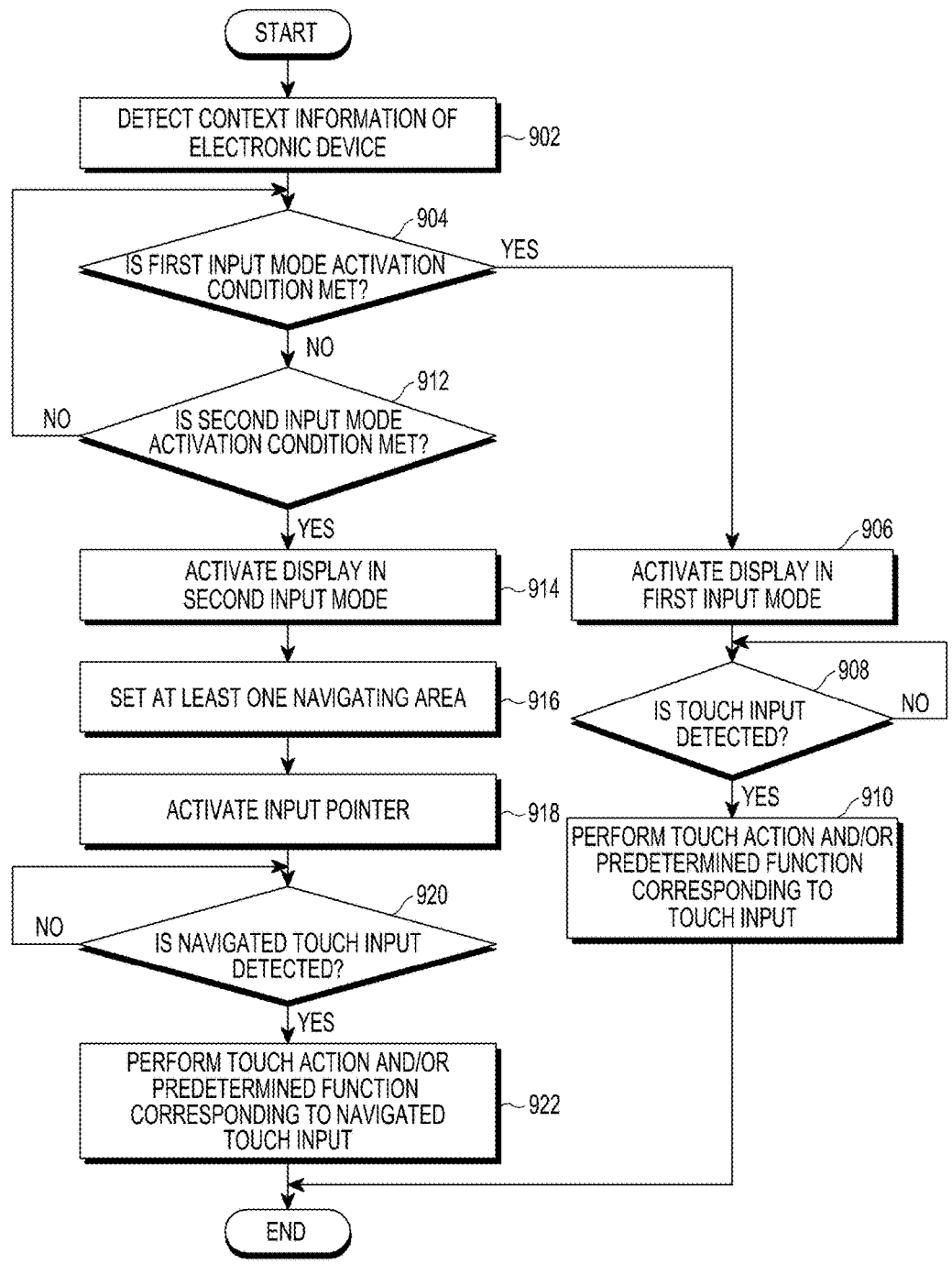
FIG. 9 is a flowchart illustrating an adaptive touch input method using a display of an electronic device according to various embodiments.

FIG. 9 is a flowchart illustrating an adaptive touch input method using a display of an electronic device according to various embodiments. The adaptive touch input method using the display of the electronic device may include operations 902 to 922. The adaptive touch input method using the display of the electronic device may be performed by at least one of the electronic device (for example, the electronic device 401) and the processor (for example, the processor 460) of the electronic device.

In operation 902, for example, the electronic device may identify context information related to the electronic device through the display (for example, the touch screen panel) or the sensor (for example, a grip sensor, a proximity sensor, an acceleration sensor, a gyro sensor, or a motion sensor). Since operation 902 is the same as operation 820 of FIG. 8, a detailed description thereof will be replaced with the description of operation 820.

In operation 904, for example, the electronic device may determine whether the context information meets a first input mode activation condition predesignated to activate the display (for example, the touch screen panel) in the first input mode based on the detected context information. The electronic device may perform operation 906 when the context information meets the first input mode activation condition and perform operation 912 when the context information does not meet the first input mode activation condition.

For example, the electronic device may determine whether a touch and/or a touch action is detected through the touch screen panel on the display. When the touch and/or the touch action is detected through the touch screen panel on the display, the electronic device may activate the display in the first input mode.

For example, the electronic device may determine whether a predetermined operation corresponding to the first input mode activation condition is performed. When the predetermined operation corresponding to the first input mode activation condition is performed, the electronic device may activate the display in the first input mode.

For example, the electronic device may predesignate and store context of the electronic device corresponding to the first input mode activation condition. For example, when the location of the electronic device corresponds to the predetermined location to activate the display in the first input mode, the electronic device may determine that the context information meets the first input mode activation condition. For example, when the position of the electronic device corresponds to the predetermined position to activate the display in the first input mode, the electronic device may determine that the context information meets the first input mode activation condition. For example, when the electronic device reaches a predetermined time to activate the display in the first input mode, the electronic device may determine that the context information meets the first input mode activation condition. For example, when an application or content predetermined by the user to activate the display in the first input mode is executed, the electronic device may determine that the context information meets the first input mode activation condition. For example, when voice information input through a voice input means (for example, a microphone) corresponds to predetermined voice information to activate the display in the first input mode, the electronic device may determine that the context information meets the first input mode activation condition.

According to an embodiment, the electronic device may set the activated state of the display (for example, the touch screen panel) in the first input mode by default.

In operation 906, for example, the electronic device may activate the display (for example, the touch screen panel) in the first input mode.

In operation 908, for example, the electronic device may determine whether a touch input corresponding to a touch actually generated through the display activated in the first input mode is detected. The electronic device may perform operation 910 when the touch input is detected and periodically or aperiodically perform operation 908 when the touch input is not detected.

In operation 910, for example, the electronic device may perform a touch action and/or a predetermined function corresponding to the detected touch input. For example, when the touch is detected through the display activated in the first input mode, the electronic device may acquire a touch input of a position (for example, x and y coordinates) where the touch is detected. The electronic device may perform a touch action (for example, a touch, continuous touches, a drag & drop, zoom-in, zoom-out, or swiping) corresponding to the acquired touch input. Further, the electronic device may perform a predetermined function corresponding to the acquired touch input. For example, the electronic device may select an object corresponding to the acquired touch input from at least one object (for example, icon) displayed on the display or perform a predetermined function related to the selected object.

Meanwhile, when the detected context information does not meet the first input mode activation condition in operation 904, the electronic device may perform operation 912.

In operation 912, for example, the electronic device may determine whether the context information meets a second input mode activation condition predesignated to activate the display (for example, the touch screen panel) in the second input mode based on the detected context information. The electronic device may perform operation 914 when the context information meets the second input mode activation condition, and may perform operation 904 when the context information does not meet the second input mode activation condition.

For example, the electronic device may designate or store in advance at least one context related to the electronic device corresponding to the second input mode activation condition. For example, when the detected context information corresponds to a predetermined (and/or pre-stored) context corresponding to the second input mode activation condition, the electronic device may determine that the second input mode activation condition is met.

According to an embodiment, when the location of the electronic device in the detected context information corresponds to a predetermine location corresponding to the second input mode activation condition, the electronic device may determine that the detected context information meets the second input mode activation condition.

According to an embodiment, when the position of the electronic device in the detected context information corresponds to a predetermined position corresponding to the second input mode activation condition, the electronic device may determine that the detected context information meets the second input mode activation condition.

According to an embodiment, when the time of the electronic device in the detected context information reaches a preset time corresponding to the second input mode activation condition, the electronic device may determine that the detected context information meets the second input mode activation condition.

According to an embodiment, when an executed application or content in the detected context information corresponds to a predetermined application or content corresponding to the second input mode activation condition, the electronic device may determine that the detected context information meets the second input mode activation condition.

According to an embodiment, when voice information input through a voice input means (for example, a microphone) in the detected context information corresponds to predetermined voice information corresponding to the second input mode activation condition, the electronic device may determine that the context information meets the second input mode activation condition.

In operation 914, for example, the electronic device may activate the display (for example, the touch screen panel) in the second input mode.

According to an embodiment, when the display has been already activated in the first input mode and it is determined that the detected context information meets the second input mode activation condition in operation 912, the electronic device may change the display from the first input mode to the second input mode.

In operation 916, for example, the electronic device may set one or more areas of the display (for example, the touchy screen panel). For example, when the display is activated in the second input mode, the electronic device may set at least some areas (hereinafter, referred to as "navigating areas") of the display for controlling a touch on the (entire) area of the display.

In operation 918, for example, the electronic device may activate (for example, enable) an input pointer indicating a navigated input detected through the navigating area while the display (for example, the touch screen panel) is activated in the second input mode.

According to an embodiment, the electronic device may enable the input pointer according to whether a preset operation to enable the input pointer is performed. For example, the electronic device may determine whether the operation preset by the user (for example, an operation of performing a touch within the navigating area and performing a drag to the outside of the navigating area) is performed and, when the preset operation is performed, may display, on the display, the input pointer indicating the navigated input on the display in response to the touch input detected in the navigating area, so as to enable the input pointer.

According to an embodiment, the electronic device may enable the input pointer according to whether a preset physical motion or position of the electronic device to enable the input pointer is detected. The electronic device may determine whether the preset physical motion (an operation of shaking the electronic device in upward and downward directions or leftward and rightward directions by a predetermined number of times) of the electronic device to enable the input pointer is detected and, when the preset physical motion of the electronic device is detected, may display, on the display, the input pointer indicating the navigated input on the display in response to the touch input detected in the navigating area, so as to enable the input pointer. Further, the electronic device may determine whether the preset position (for example, a position of the electronic device having a first axis at a particular angle) of the electronic device to enable the input pointer is detected and, when the preset position of the electronic device is detected, may display, on the display, the input pointer indicating the navigated input on the display in response to the touch input detected in the navigating area, so as to enable the input pointer.

According to an embodiment, for example, the electronic device may enable the input pointer according to whether a preset particular type of touch action or a preset particular type of touch to enable the input pointer is detected. The electronic device may determine whether a preset particular touch action (for example, continuous touches) to enable the input pointer is detected and, when the preset particular type of touch action is detected, may display, on the display, the navigated input on the display in response to the touch input detected in the navigating area, so as to enable the touch pointer. Further, the electronic device may determine whether the preset particular type of touch (for example, a pressure touch, a hovering touch, or a proximity touch) to enable the input pointer is detected and, when the preset particular type touch is detected, may display, on the display, the navigated input on the display in response to the touch input detected in the navigating area, so as to enable the touch pointer.

According to an embodiment, the touch action type may include at least one of, for example, a touch, continuous touches, a drag & drop, zoom-in, zoom-out, and swiping.

According to an embodiment, the touch type may include at least one of, for example, a touch (for example, a pressure touch) by a physical contact with the display (for example, the touch screen panel), and a touch (for example, a hovering touch or a proximity touch) by a non-contact within a predetermined interval from the display through a grip sensor or a proximity sensor.

In operation 920, for example, the electronic device may determine whether the navigated input on the display (for example, the touch screen panel) corresponding to the touch input detected through the navigating area is detected using the activated input pointer. For example, when the touch input at a touch position (for example, x and y coordinates) where the touch is generated in the navigating area is detected, the electronic device may detect the navigated input at a position (for example, X' and Y' coordinates) on the display corresponding to the touch input (for example, x and y coordinates).

In operation 922, for example, the electronic device may perform a touch action and/or a predetermined function corresponding to the detected navigated input. For example, when the touch is detected through the navigating area corresponding to the one or more areas of the display activated in the second input mode, the electronic device may acquire the navigated input of the position (for example, X' and Y' coordinates) on the display corresponding to the touch input of the position (for example, x and y coordinates) where the touch is detected. The electronic device may perform a touch action (for example, a touch, continuous touches, a drag & drop, zoom-in, zoom-out, or swiping) corresponding to the acquired navigated input. Further, the electronic device may perform a predetermined function corresponding to the acquired navigated input. For example, the electronic device may select an object corresponding to the acquired navigated input from at least one object (for example, icon) displayed on the display or perform a predetermined function related to the selected object.

The operations (for example, operations 810 to 840 or operations 902 to 922) described in the processes and methods illustrated in FIGS. 8 to 9 may be performed in a sequential, parallel, repetitive, or heuristic method. For example, the operations may be performed in a different order, some of the operations may be omitted, or other operations may be added.

According to various embodiments, a method of performing an adaptive touch input using a display of an electronic device may include: activating the display in a first input mode to acquire a first touch input through the display; identifying context information related to the electronic device through the display or the sensor; changing the display to a second input mode to acquire a second touch input through one or more areas of the display when the context information meets a predetermined condition; and executing a predetermined function related to at least one object displayed on the display based on the second touch input acquired through the one or more areas while the display is in the second input mode.

According to various embodiments, the method of performing the adaptive touch input using the display of the electronic device may further include displaying representations indicating the at one or more areas that have changed to the second input mode on the display.

According to various embodiments, the method of performing the adaptive touch input using the display of the electronic device may further include displaying one or more of the representations corresponding to the second touch input on an external electronic device.

According to various embodiments, changing the display to the second input mode may include: acquiring voice information related to the context information of the electronic device through a microphone of the electronic device; and changing the display from the first input mode to the second input mode based on the acquired voice information.

According to various embodiments, the method of performing the adaptive touch input using the display of the electronic device may further include deactivating the second input mode when the first touch input is acquired through the one or more areas while the display is in the second input mode.

According to various embodiments, the context information may include a location and an attitude of the electronic device, a time preset to the electronic device, execution of a predetermined application or content, or a combination thereof.

According to various embodiments, the second touch input may include a hovering touch input, a proximity touch input, a pressure touch input, or a combination thereof.

According to various embodiments, executing the predetermined function related to the at least one object displayed on the display based on a touch input detected at a first position of the display may include at least one of performing selection or movement of the object, or enlargement or reduction of at least a part of the object, as at least a part of the predetermined function.

According to various embodiments, executing the predetermined function related to the at least one object displayed on the display based on the second touch input acquired through the one or more areas while the display is in the second input mode may include an operation of executing an application corresponding to the object as a part of the predetermined function.

According to various embodiments, the method of performing the adaptive touch input using the display of the electronic device may further include displaying, on the display, at least one input pointer indicating a navigated input on the display in accordance with the second touch input acquired through the one or more areas while the display is in the second input mode.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium having instructions stored therein is provided. The instructions may be configured to cause, when executed by at least one processor, the processor to perform at least one operation. The operation may include: activating the display in a first input mode to acquire a first touch input through the display of the electronic device; identifying context information related to the electronic device through the display or the sensor; changing the display to a second input mode to acquire a second touch input through one or more areas of the display when the context information meets a predetermined condition; and executing a predetermined function related to at least one object displayed on the display based on the second touch input acquired through the one or more areas of the display while the display is in the second input mode.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. An electronic device comprising:
   a display;
   a sensor; and
   a processor configured to:
   activate the display in a first input mode to acquire a first touch input through the display,
   identify context information related to the electronic device through the display or the sensor,
   change the display to a second input mode to acquire a second touch input through one or more areas of the display when the context information meets a predetermined condition,
   display at least one pointer that indicates a navigated input based on the second touch input on the display, in response to a determination that a touch and drag is performed from within one of the one or more areas to the outside of the one of the one or more areas for enabling the at least one pointer in the second input mode while in the second input mode, and
   execute a predetermined function related to at least one object displayed on the display based on the second touch input acquired through the one or more areas using the at least one pointer while the display is in the second input mode.

2. The electronic device of claim 1, wherein the processor is configured to display a representation indicating the one or more areas that have changed to the second input mode on the display.

3. The electronic device of claim 1, wherein the processor is configured to display at least one representation corresponding to the second touch input on an external electronic device.

4. The electronic device of claim 1, wherein the sensor includes a microphone, and the processor is configured to acquire voice information related to the context information of the electronic device through the microphone and to change the display from the first input mode to the second input mode based on the acquired voice information.

5. The electronic device of claim 1, wherein the processor is configured to perform another predetermined function different from the predetermined function when the first touch input is acquired through the one or more areas while the display is in the second input mode.

6. The electronic device of claim 1, wherein the context information includes at least one of a location and an attitude of the electronic device, a time preset to the electronic device, or an execution of a predetermined application or content.

7. The electronic device of claim 1, wherein the first touch input and the second touch input include at least one of a hovering touch input, a proximity touch input, or a pressure touch input.

8. The electronic device of claim 1, wherein the processor is configured to perform at least one of selection or movement of the at least one object, or enlargement or reduction of at least a part of the object, as at least a part of the predetermined function.

9. The electronic device of claim 1, wherein the processor is configured to execute an application corresponding to the at least one object as at least a part of the predetermined function.

10. The electronic device of claim 1, wherein the processor is configured to display, on the display, at least one input pointer indicating a navigated input on the display in accordance with the second touch input acquired through the one or more areas while the display is in the second input mode.

11. The electronic device of claim 1, wherein the predetermined function related to the at least one object includes at least one of movement of the at least one object, or enlargement or reduction of at least a part of the object.

12. The electronic device of claim 1, wherein two pointers are displayed, and are in different shapes from each other.

13. A method of performing an adaptive touch input using a display of an electronic device, the method comprising:
    activating the display in a first input mode to acquire a first touch input through the display,
    identifying context information related to the electronic device through the display or a sensor,
    changing the display to a second input mode to acquire a second touch input through one or more areas of the display when the context information meets a predetermined condition,
    displaying at least one pointer that indicates a navigated input based on the second touch input on the display, in response to a determination that a touch and drag is performed from within one of the one or more areas to the outside of the one of the one or more areas for enabling the at least one pointer in the second input mode while in the second input mode; and
    executing a predetermined function related to at least one object displayed on the display based on the second touch input acquired through the one or more areas using the at least one pointer while the display is in the second input mode.

14. The method of claim 13, further comprising displaying a representation indicating that the one or more areas that have changed to the second input mode on the display.

15. The method of claim 13, further comprising displaying a representation corresponding to the second touch input on an external electronic device.

16. The method of claim 13, wherein changing the display to the second input mode comprises:
    acquiring voice information related to the context information of the electronic device through a microphone of the electronic device; and
    changing the display from the first input mode to the second input mode based on the acquired voice information.

17. The method of claim 13, further comprising deactivating the second input mode when the first touch input is acquired through the one or more areas while the display is in the second input mode.

18. The method of claim 13, wherein the context information includes at least one of a location and an attitude of the electronic device, a time preset to the electronic device, or an execution of a predetermined application or content.

19. The method of claim 13, wherein executing the predetermined function related to the at least one object displayed on the display comprises at least one of performing selection or movement of the object, or enlargement or reduction of at least a part of the object, as at least a part of the predetermined function.

20. The method of claim 13, wherein executing the predetermined function related to the at least one object displayed on the display comprises executing an application corresponding to the object as at least a part of the predetermined function.

21. The method of claim 13, further comprising displaying, on the display, at least one input pointer indicating a navigated input on the display in accordance with the second touch input acquired through the one or more areas while the display is in the second input mode.

22. The method of claim 13, wherein the predetermined function related to the at least one object includes at least one of movement of the at least one object, or enlargement or reduction of at least a part of the object.

23. The electronic device of claim 1, wherein two pointers are displayed, and are in different shapes from each other.

24. A non-transitory computer-readable recording medium having a program recorded therein to be executed in a computer, the program comprising executable instructions to cause, when executed by a processor, the processor to perform operations, the operations comprising:

activating a display in a first input mode to acquire a first touch input through the display, identifying context information related to an electronic device through the display or a sensor, changing the display to a second input mode to acquire a second touch input through one or more areas of the display when the context information meets a predetermined condition, displaying at least one pointer that indicates a navigated input based on the second touch input on the display, in response to a determination that a touch and drag is performed from within one of the one or more areas to the outside of the one of the one or more areas for enabling the at least one pointer in the second input mode while in the second input mode; and executing a predetermined function related to at least one object displayed on the display based on the second touch input acquired through the one or more areas using the at least one pointer while the display is in the second input mode.

* * * * *